United States Patent [19]
Reiter

[11] 3,967,137
[45] June 29, 1976

[54] CIRCUIT ARRANGEMENT FOR WEIGHTING A CURRENT ACCORDING TO MAGNITUDE AND DIRECTION

[75] Inventor: Herbert Reiter, Munich, Germany

[73] Assignee: Siemens Aktiengesellschaft, Munich, Germany

[22] Filed: Dec. 4, 1974

[21] Appl. No.: 529,492

[30] Foreign Application Priority Data
Dec. 4, 1973 Germany............................ 2360375

[52] U.S. Cl....................... 307/235 R; 179/16 AA; 307/236; 328/140; 328/146
[51] Int. Cl.².................. H03K 5/153; H03K 5/20; H04M 3/30
[58] Field of Search.......... 307/235 W, 235 T, 236; 328/140, 146, 150; 179/6 AA, 16 F

[56] References Cited
UNITED STATES PATENTS

| | | | |
|---|---|---|---|
| 3,035,122 | 5/1962 | Livingstone | 179/16 F |
| 3,435,257 | 3/1969 | Lawrie, Jr. | 307/289 |
| 3,514,543 | 5/1970 | Rae | 179/16 F |
| 3,579,106 | 5/1971 | Lord | 179/16 AA X |
| 3,781,480 | 12/1973 | Roge | 179/16 F |
| 3,783,198 | 1/1974 | Couch | 179/16 AA |
| 3,819,866 | 6/1974 | Hawley | 179/16 AA |
| 3,860,868 | 1/1975 | Lindell et al. | 307/236 X |

Primary Examiner—John S. Heyman
Assistant Examiner—Larry N. Anagnos
Attorney, Agent, or Firm—Schuyler, Birch, Swindler, McKie & Beckett

[57] ABSTRACT

A circuit is disclosed for providing a digital representation of the magnitude and polarity of current signals using only a single threshold device. A series connected pair of current converters, one of which includes a pre-set threshold, are connected with rectifier means poled to allow passage of current of a single polarity. A second rectifier means poled to pass the current of opposite polarity is connected to pass such current only to the current responsive device with threshold means, bridging the second current device. An accurate digital representation is thereby obtained, with minimal component outlay.

2 Claims, 1 Drawing Figure

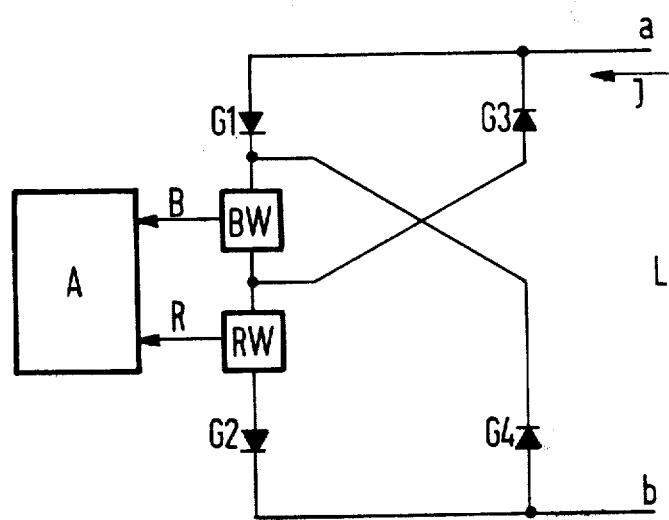

CIRCUIT ARRANGEMENT FOR WEIGHTING A CURRENT ACCORDING TO MAGNITUDE AND DIRECTION

BACKGROUND OF THE INVENTION

The present invention relates to a circuit arrangement for weighting a current as a function of its magnitude and direction in a receiver circuit for telegraph and data systems engineering.

In telegraph engineering, single current or double current signals are employed for transmitting the information and a sequence of control criteria. In the first instance, current pulses on the line alternate with a no-current condition on the line. In the second instance, pulses of one polarity are interleaved with pulses of the opposite polarity. Devices for telegraph engineering including the modes of transmission used therein are increasingly being utilized for data transmission. Thus the problems of weighting said signals at the receiving end also increase in importance.

In a receiver circuit for telegraph and data systems engineering two problems are presented. It is necessary to differentiate, in the case of single current, between a current pulse and the no-current condition of the line. In the case of double current, a current pulse with a positive polarity must be differentiated from one with a negative polarity. It must also be detected if, in the case of single current system, there is a change of current polarity; and, in the case of double current system, the "no-current" condition must be detected if it prevails. Thus, in both cases, in addition to the conditions established by information signals sought to be transmitted, the conditions outlined herein must be detected.

It is known to carry out weighting of a current of a specified magnitude using threshold responsive weighting means. To weight currents having different polarities, it is known to provide two weighting means set to a specified threshold which deliver an output signal, to an interpreting circuit when the threshold is exceeded. To provide the function of weighting the current independently of direction or polarity, the weighting means are looped into the receiver line over appropriately polarized rectifiers. However, such a current-weighting device requires that both weighting means have a very accurate threshold response. This requisite condition is significant, because with each change of the threshold in a weighting means, the incoming signal on the receiving line is distorted upon being scanned. Further, despite the substantial amount of circuitry utilized, external influences or component tolerances have varying effects on both weighting means. Thus the threshold values vary not only with respect to their absolute values but also with respect to each other.

SUMMARY OF THE INVENTION

One object of the invention is to provide a device in receiver circuits for telegraph and data systems for weighting a current according to direction and magnitude which avoids the drawback mentioned above.

In accordance with the invention, the foregoing and other objects are achieved in that for weighting or coding the magnitude and direction of current, there are provided two separate devices which are connected between the wires of a receiving line over a rectifier capable of passing the current of one direction, first of these two devices for weighting or coding the current magnitude is connected to both wires of the receiving line over another rectifier capable of passing the other direction of current.

In the device constructed according to the invention, therefore, only one threshold is set, viz: the threshold in the device for weighting the magnitude of the current. Distortions created in conventional circuits of the prior art as a result of the relative variations between the thresholds two separate devices as described above are thereby avoided.

According to a further development of the invention, the first and second device are connected to an evaluating device wherein, depending on the output signals of the two weighting means, a previously defined output signal is available. Thus, it is possible to detect without much outlay, the weighting of a current in terms of magnitude and direction.

BRIEF DESCRIPTION OF THE DRAWING

The principles of the invention will be explained with reference to the accompanying drawing comprising a schematic diagram of the weighting circuit of this invention.

DETAILED DESCRIPTION OF A PREFERRED EMBODIMENT

The first device for weighting or coding the magnitude of the current is labeled BW, and RW is the second device weighting or coding the direction of the current.

The device BW is termed a threshold detector or current threshold responsive device or coder and provides an output B=1 or B=0 depending on the magnitude of the current as compared to a fixed threshold. The device RW is termed a polarity detector or current direction responsive device or coder and provides an output R=0 or R=1 depending on the direction or polarity of the current as compared to some pre-established standard. Such coders are of course of a design well known in the logic design and analog-to-digital coding arts, and are therefore not described in detail.

The first and second detector devices BW and RW are connected between the wires a and b of the receiving line L via the two rectifiers G1 and G2. In the preferred embodiment the two rectifiers G1 and G2 are connected to the terminals in such a manner that a current I flowing in a positive direction energizes both the first and second weighting means. If a current of said direction exceeds the threshold set in the first device BW, a predetermined output signal is provided (B=1). As a result of the current flowing through the second weighting device RW a predetermined output signal (R=1) is likewise provided from said device. In the evaluating circuit A both output signals B and R are converted according to a clearly defined criterion, in accordance with principles well known in the art.

The first magnitude responsive detector device BW is connected in a second current path to be responsive to a flow of current in the reverse direction over rectifiers G3 and G4 which pass current of the opposite direction.

Because of the poling of rectifiers G3 and G4, only the first detecting device BW is energized by current I. If current I exceeds the threshold set in this first device BW, the output signal B=1 is again provided. However, the second device RW is now bridged by the rectifiers G4 and G3, so that the second device RW provides no output signal (R=0). Thus, in the evaluating circuit A, the output signals B=1 or B=0 and R=0 are available, which are again converted into clearly-defined output criterion.

If the current flowing on the line L does not exceed the threshold set in the first device BW, the output signal is switched off (B=0). The weighting of the output signal B=0 takes place independently of the direction of the current flowing on the line L. It can be seen that the circuit arrangement may be used both for single current operation and double current operation. For both modes of operation the evaluating circuit A is capable of providing a criterion clearly defining the conditions of magnitude and direction existing on the line as explained at the start of the application.

Modification of this exemplary embodiment described above may occur to one of skill in the art without departing from the spirit and scope of the invention, which is to be defined only by the appended claims.

I claim:

1. A circuit for providing a code defining the magnitude and direction of a current on a line, comprising
   first and second current responsive devices connected in series, each of said devices providing a predetermined binary signal in response to the current on said line,
   said first current responsive device comprising means for establishing a threshold, whereby the binary output signal of said first device comprises information defining the relative magnitude of the current through said device as compared to said threshold,
   said second current responsive device providing the binary signal indication of the direction of current on said line,
   first rectifier means connecting said current responsive devices between the wires of said line, said rectifier means being poled to pass only the current of a first predetermined direction on said line to said current responsive devices,
   and second rectifier means oppositely poled with respect to said first rectifier means and connected to pass current to said first current responsive device while bridging said second current responsive device, whereby only said first device is responsive to the current in the second direction opposite to said first direction, whereby the binary output signals of said first and second devices indicate the magnitude and polarity of said current in said first or said second direction.

2. A circuit as claimed in claim 1 wherein said first rectifier means comprises first and second diodes connected in series with said first and second devices and poled to pass current in the same direction, and
   said second rectifier means comprises third and fourth diodes oppositely poled with respect to said first and second diodes and connected in series therewith respectively, and to opposite sides of said first device, whereby a series circuit comprising said third and fourth diodes and said first device is established responsive to current in the second direction defined by said third and fourth diodes, said series circuit effectively bypassing said second device.

* * * * *